(12) United States Patent
Snapp et al.

(10) Patent No.: US 8,677,140 B2
(45) Date of Patent: *Mar. 18, 2014

(54) DELIVERY POINT VALIDATION SYSTEM

(75) Inventors: Robert F. Snapp, Memphis, TN (US); James D. Wilson, Collierville, TN (US)

(73) Assignee: United States Postal Service, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,953

(22) Filed: Sep. 12, 2012

(65) Prior Publication Data

US 2013/0246804 A1    Sep. 19, 2013

Related U.S. Application Data

(63) Continuation of application No. 11/892,175, filed on Aug. 20, 2007, now Pat. No. 8,291,234, which is a continuation of application No. 10/344,990, filed as application No. PCT/US01/26125 on Aug. 21, 2001, now Pat. No. 7,302,582.

(60) Provisional application No. 60/226,568, filed on Aug. 21, 2000, provisional application No. 60/277,622, filed on Mar. 22, 2001, provisional application No. 60/281,411, filed on Apr. 5, 2001.

(51) Int. Cl.
*G06F 21/00*    (2013.01)

(52) U.S. Cl.
USPC .................. 713/186; 726/6; 726/24; 380/30; 380/280; 380/285; 705/71; 705/74; 705/75; 709/201

(58) Field of Classification Search
USPC ........................................................ 713/186
See application file for complete search history.

(56) References Cited

U.S. PATENT DOCUMENTS

| | | | |
|---|---|---|---|
| 4,187,551 A | 2/1980 | Nutter et al. | |
| 4,290,105 A | 9/1981 | Cichelli et al. | |

(Continued)

FOREIGN PATENT DOCUMENTS

| | | |
|---|---|---|
| CN | 1311486 | 9/2001 |
| DE | 44 21 640 | 8/1995 |

(Continued)

OTHER PUBLICATIONS

The Sybil Attack| http://www.few.vu.nl/~mconti/teaching/ATCNS2010/ATCS/Sybil/Sybil.pdf|John R. Douceur|pp. 1-6|2002.*

(Continued)

*Primary Examiner* — Mahfuzur Rahman
(74) *Attorney, Agent, or Firm* — Finnegan, Henderson, Farabow, Garrett & Dunner LLP

(57) ABSTRACT

A computer-implemented method represents a list of informational items using a bit array. The method converts an informational item to a cryptographic value using a cryptographic algorithm and extracts a plurality of n-bit samples from the cryptographic value. The n-bit samples includes at least a first field and a second field. The first field identifies a group of bits of the bit array and the second field identifies one or more individual bits within the group of bits. The individual bits are set to a pre-determined value according to the first field identifying the group of bits and the second field identifying the individual bits within the group of bits.

12 Claims, 7 Drawing Sheets

(56) References Cited

U.S. PATENT DOCUMENTS

| | | | |
|---|---|---|---|
| 4,498,148 | A | 2/1985 | Glickman |
| 4,538,240 | A | 8/1985 | Carter et al. |
| 4,641,274 | A | 2/1987 | Swank |
| 4,871,903 | A | 10/1989 | Carrell et al. |
| 5,204,966 | A | 4/1993 | Wittenberg et al. |
| 5,343,529 | A | 8/1994 | Goldfine et al. |
| 5,390,359 | A | 2/1995 | Damerau |
| 5,408,671 | A * | 4/1995 | Tanaka .......................... 709/214 |
| 5,420,403 | A | 5/1995 | Allum et al. |
| 5,491,752 | A | 2/1996 | Kaufman et al. |
| 5,522,056 | A * | 5/1996 | Watanabe et al. ............. 711/128 |
| 5,533,816 | A * | 7/1996 | Ikeda et al. .............. 400/120.07 |
| 5,742,807 | A | 4/1998 | Masinter |
| 5,819,291 | A | 10/1998 | Haimowitz et al. |
| 5,893,120 | A | 4/1999 | Nemes |
| 5,903,651 | A | 5/1999 | Kocher |
| 5,933,604 | A | 8/1999 | Inakoshi |
| 5,953,502 | A | 9/1999 | Helbig, Sr. |
| 5,966,542 | A | 10/1999 | Tock |
| 6,006,200 | A | 12/1999 | Boies et al. |
| 6,289,334 | B1 | 9/2001 | Reiner et al. |
| 6,289,450 | B1 | 9/2001 | Pensak et al. |
| 6,308,247 | B1 | 10/2001 | Ackerman et al. |
| 6,347,376 | B1 | 2/2002 | Attwood et al. |
| 6,457,012 | B1 | 9/2002 | Jatkowski |
| 6,516,320 | B1 | 2/2003 | Odom et al. |
| 6,625,592 | B1 | 9/2003 | Dyer et al. |
| 6,675,163 | B1 | 1/2004 | Bass et al. |
| 6,697,947 | B1 | 2/2004 | Matyas et al. |
| 6,754,785 | B2 | 6/2004 | Chow et al. |
| 6,757,675 | B2 * | 6/2004 | Aiken et al. .......................... 1/1 |
| 6,763,344 | B1 | 7/2004 | Osentoski et al. |
| 7,062,655 | B2 | 6/2006 | Nelson et al. |
| 7,124,408 | B1 | 10/2006 | Parthasarathy et al. |
| 7,159,119 | B2 | 1/2007 | Wilson et al. |
| 7,302,582 | B2 | 11/2007 | Snapp et al. |
| 7,350,078 | B1 | 3/2008 | Odom |
| 7,587,408 | B2 | 9/2009 | Snapp et al. |
| 2001/0044783 | A1 | 11/2001 | Weisberg et al. |
| 2002/0049670 | A1 | 4/2002 | Moritsu et al. |
| 2003/0028783 | A1 | 2/2003 | Collins et al. |
| 2003/0177021 | A1 | 9/2003 | Dutta |
| 2004/0065598 | A1 | 4/2004 | Ross et al. |
| 2004/0111443 | A1 | 6/2004 | Wong et al. |
| 2004/0128247 | A1 | 7/2004 | Sato et al. |
| 2004/0181670 | A1 | 9/2004 | Thune et al. |
| 2004/0210763 | A1 | 10/2004 | Jonas |
| 2005/0060556 | A1 | 3/2005 | Jonas |
| 2005/0066182 | A1 | 3/2005 | Jonas et al. |

FOREIGN PATENT DOCUMENTS

| | | |
|---|---|---|
| EP | 0 381 418 | 8/1990 |
| JP | 08-235040 | 9/1996 |
| JP | 11-306676 | 11/1999 |
| JP | 2001-043135 | 2/2001 |
| JP | 2002-202938 | 7/2002 |
| WO | WO 2004/023711 A1 | 3/2004 |

OTHER PUBLICATIONS

Validation of SDL models. Telelogic tool for validation of SDL models http://fruct.org/sites/default/files/seminar/s5_Lavrovskaya.pdf|trina Lavrovskaya|St. Petersburg State University.

Office Action, dated Sep. 3, 2004, for U.S. Appl. No. 10/459,013, filed Jun. 11, 2003 (12 pages).

Office Action, dated Sep. 20, 2004, for U.S. Appl. No. 10/377,989, filed Feb. 28, 2003 (4 pages).

Office Action, dated Mar. 24, 2005, for U.S. Appl. No. 10/459,013, filed Jun. 11, 2003 (14 pages).

Office Action, dated Apr. 15, 2005, for U.S. Appl. No. 10/377,989, filed Feb. 28, 2003 (4 pages).

Office Action, dated Oct. 27, 2005, for U.S. Appl. No. 10/459,013, filed Jun. 11, 2003 (12 pages).

Office Action. dated Apr. 4, 2006, for U.S. Appl. No. 10/344,990, filed Feb. 20, 2003 (8 pages).

Office Action, dated Nov. 28, 2006, for U.S. Appl. No. 10/344,990, filed Feb. 20, 2003 (4 pages).

Office Action, dated Jun. 3, 2008, for U.S. Appl. No. 11/235,243, filed Sep. 27, 2005 (8 pages).

Office Action, dated Jul. 16, 2008, for U.S. Appl. No. 11/638,445, filed Dec. 14, 2006 (8 pages).

Office Action, dated Aug. 7, 2008, for U.S. Appl. No. 11/231,989, filed Sep. 22, 2005 (15 pages).

Pre-Interview Communication, dated Sep. 12, 2008, for U.S. Appl. No. 11/231,989, filed Sep. 22, 2005 (3 pages).

Pre-interview First Office Action, dated Dec. 2, 2008, for U.S. Appl. No. 11/231,989, filed Sep. 22, 2005 (3 pages).

Interview Summary, dated Nov. 30, 2004, for U.S. Appl. No. 10/459,013, filed Jun. 11, 2003 (2 pages).

Interview Summary, dated Sep. 21, 2005, for U.S. Appl. No. 10/459,013, filed Jun. 11, 2003 (2 pages).

Notice of Allowance and Allowability, dated May 7, 2006, for U.S. Appl. No. 10/459,013 (16 pages).

Notice of Allowance and Allowability, dated Jul. 17, 2007, for U.S. Appl. No. 10/344,990 (6 pages).

Notice of Allowance and Allowability, dated May 4, 2009, for U.S. Appl. No. 10/377,989 (4 pages).

Notice of Allowance and Allowability, dated Jan. 13, 2009, for U.S. Appl. No. 11/235,243 (6 pages) with Response to Office Action, filed Nov. 12, 2008; including listing of allowed claims (18 pages).

Notice of Allowance and Allowability, dated Jun. 30, 2009, for U.S. Appl. No. 11/231,989 (12 pages).

Notice of Allowance and Allowability, dated Jul. 15, 2009, for U.S. Appl. No. 11/638,445 (6 pages), with Reply to Office Action, filed Nov. 14, 2008, including listing of allowed claims (19 pages).

Second Supplemental Preliminary Amendment, filed Aug. 20, 2008, for U.S Appl. No. 11/231,989, filed Sep. 22, 2005, including listing of claims (9 pages).

PCT Written Opinion, mailed Aug. 2, 2004, for International No. PCT/US03/18412 (5 pages).

PCT international Search Report, mailed Mar. 26, 2002, for International Application No. PCT/US01/26125 (4 pages).

PCT Written Opinion, mailed Feb. 13, 2003, for International Application No. PCT/US01/26125 (4 pages).

PCT International Preliminary Examination Report, completed May 6, 2003, for International Application No. PCT/US01/26125 (4 pages).

Supplementary European Search Report, dated Feb. 17, 2009, for European Application No. 03739087.9-1525 (3 pages).

Office Action, dated Nov. 21, 2008, for Chinese Application No. 03824536.1, filed Jun. 11, 2003 (11 pages).

Office Action, dated May 8, 2009, for Chinese Application No. 03824536.1, filed Jun. 11, 2003 (8 pages).

Office Action, dated May 26, 2009, fear Japanese Application No. 2004-534223, filed Jun. 11, 2003 (9 pages).

Office Action, dated Jan. 5, 2010, in Japanese Application No. 2007-000658, filed Jan. 5, 2007 (12 pages).

Office Action, dated May 20, 2010, in European Patent Application No. 03 739 087.9-1525, filed Apr. 6, 2005 (5 pages).

"Application of DB2 Anonymous Resolution to the Financial Services Industry," Whitepaper of IBM Corporation, USA, May 2005 (17 pages).

Bellare et al., "Collision-Resistant Hashing: Towards Making UOWHFs Practical," Advances in Cryptology Conference (CRYPTO); Germany; vol. Conf. 17, pp. 470-484, (1997).

Carter et al., "Exact and Approximate Membership Testers," ACM $10^{th}$ STOC, pp. 59-65, (1978).

"DB2 Anonymous Resolution for Public Safety. Corrections, & Criminal Intelligence," Publication of IBM Corporation, USA, Feb. 2005 (2 pages).

"DB2 Anonymous Resolution," Publication of IBM Corporation, USA, May 2005 (2 pages).

Friedrich, Andrew: "IBM DB2 Anonymous Resolution: Knowledge Discovery Without Knowledge Disclosure," Whitepaper of IBM Corporation, USA, May 2005 (23 pages).

(56) References Cited

OTHER PUBLICATIONS

"IBM DB2 Anonymous Resolution Version 3.8 Technical information," Publication of IBM Corporation, USA, May 2005 (2 pages).

Lohr, Steve, "I.B.M. Software Aims to Provide Security Without Sacrificing Privacy," The New York Times, May 24, 2005 (2 pages).

PCT International Search Report, mailed (Oct. 17, 2003) and Written Opinion mailed (Aug. 2, 2004) for International Application No. PCT/US03/18412 (12 pages).

PCT International Search Report, mailed (Mar. 26, 2002), Written Opinion (mailed Feb. 13, 2003) and International Preliminary Examination Report (completed May 6, 2003) for International Application No. PCT/US01/26125 (12 pages).

PCT International Search Report, mailed May 23, 2003, for International Application No. PCT/US03/06672 (5 pages), PCT International Examination Report (completed Oct. 31, 2003, mailed Nov. 12, 2003) (4 pages).

PCT Written Opinion dated Sep. 7, 2006 for International Application No. PCT/US03/12711 (8 pages).

First Examination Report from the Government of India Patent Office dated Dec. 1, 2006 (3 pages) for Patent Application No. 577/KOLNP/2005.

* cited by examiner

DELIVERY POINT VALIDATION SYSTEM

This is a continuation of, and claims the benefit of, U.S. application Ser. No. 11/892,175, filed Aug. 20, 2007, now U.S. Pat. No. 8,291,234 which was a continuation of U.S. application Ser. No. 10/344,990, filed Feb. 20, 2003, now U.S. Pat. No. 7,302,582 which was the National Stage of International application No. PCT/US01/26125, filed Aug. 21, 2001, which claims the benefits of U.S. Provisional Application No. 60/226,568, filed Aug. 21, 2000, U.S. Provisional Application No. 60/277,622, filed Mar. 22, 2001, and U.S. Provisional Application No. 60/281,411, filed Apr. 5, 2001, all of which are incorporated herein by reference.

DESCRIPTION OF THE INVENTION

Field of the Invention

The present invention relates to a system and method for validating or confirming information.

Background of the Invention

Many occasions arise when validation or confirmation of information is desired before taking a particular action. For example, a person may want to confirm that an address is a valid address before sending a valuable item or sensitive information to the address. As another example, a delivery business may want to confirm an address before sending a product. There are also occasions when validating an address can be lifesaving. For example, fire departments, ambulance companies, and police departments may want to confirm an address to efficiently respond to an emergency. There are times when other types of information, besides addresses, need to be validated or confirmed. For example, a traffic officer may need to confirm that a driver's license is valid before permitting a person to drive.

Despite the need to validate or confirm information, in today's information technology age, businesses and individuals are concerned about privacy and information security. Furthermore, businesses consider information to be a valuable company asset. Because of the concerns about information security and the view that information is an asset, owners of information may want to keep their information private and secure. On the other hand, an owner of information may also want to exploit the information by providing the information to others. For example, an owner of information comprising a list of all persons with access to a building may want to provide the list to a security company so that the security company may confirm whether a person seeking entrance into the building is on the list. However, for privacy reasons, the owner may not want to reveal to the security company all persons on the list. That is, the owner may feel that the list should only be revealed one person at a time as a person seeks entrance to the building. If a person on the list never seeks entrance to the building, then the security company never needs to know that the person is on the list. Based on the above concerns, it would be advantageous if an owner of information could provide the information to others for inquiry purposes, the information being in an encrypted format so that information may remain confidential.

SUMMARY OF THE INVENTION

In accordance with the invention, there is provided a method for representing a list of items using a bit array wherein each bit in the bit array is initialized to a first value. The method comprises converting each item into a N-bit object and determining bit positions based on the N-bit object. The method further comprises setting bits of the bit array to a second value at the determined bit positions.

There is further provided a method for determining whether an inquiry item is on a list of items. The list of items is represented by a bit array having first and second values. The method comprises converting the inquiry item into a N-bit object in a same manner that an item on a list of items is converted to produce a bit array representing the list of items. The method further comprises determining bit positions based on the N-bit object in a same manner that bit positions are determined for producing the bit array. Still further, the method comprises determining that the inquiry item is on the list if the bits of the bit array equal a second value at the determined bit positions and determining that the inquiry item is not on the list if at least one bit of the bit array does not equal a second value at the predetermined bit positions.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

Figure 1:
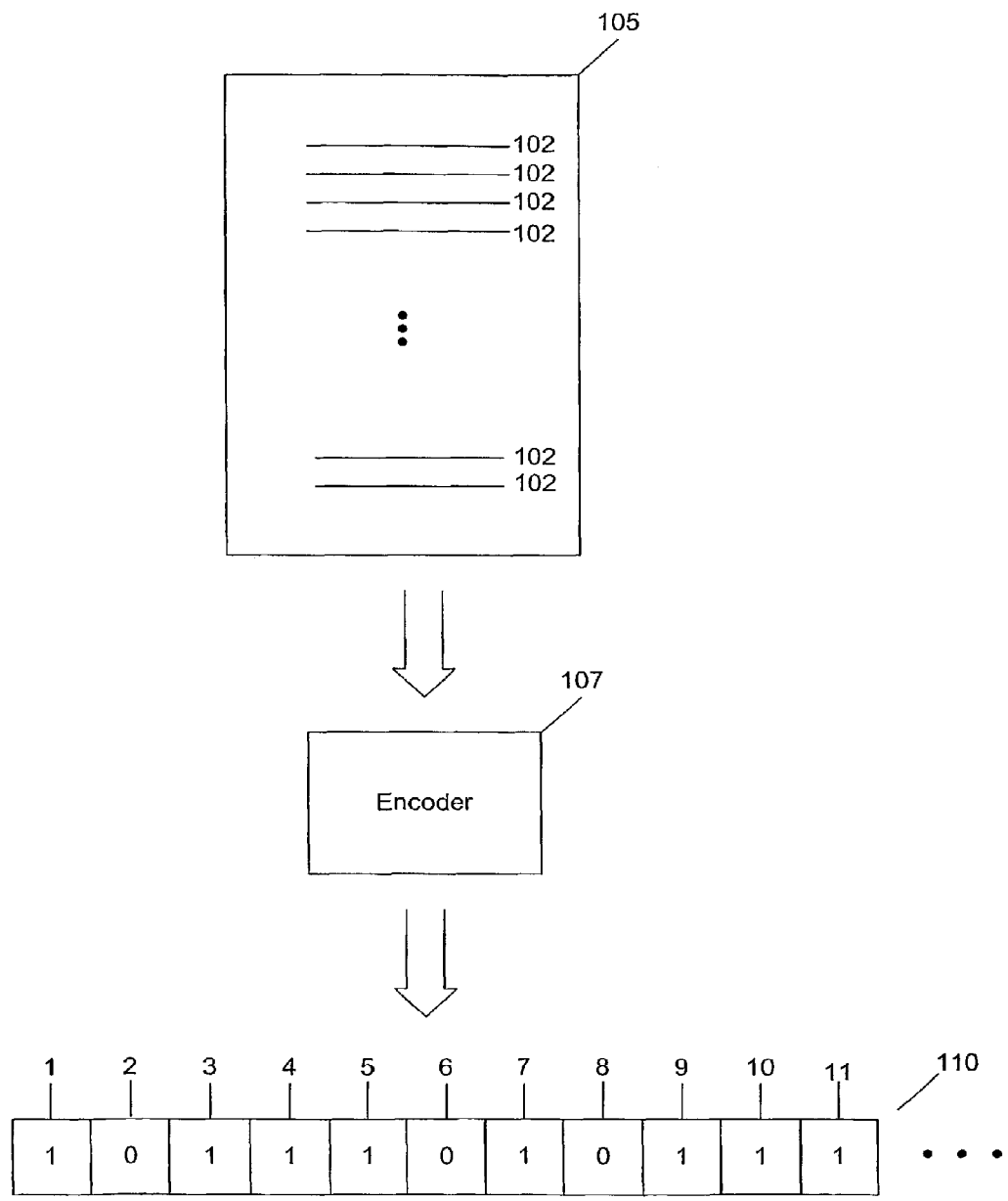
FIG. 1 illustrates a process of converting a list of items into a bit array consistent with an embodiment of the present invention.

Systems and methods consistent with the present invention encode a list so that users of the list may make inquires to the coded list without the entire content of the list being revealed to the users. FIG. 1 illustrates an example of a coded list 110 that may be derived from a list 105 based on an encoder 107 in accordance with the present invention. The list 105 may comprise addresses, names, license numbers, or any other type of information. In this example, the coded list 110 is an array of bits (i.e., 1, 2, 3, etc.) The size of the bit array 110 may be chosen to reduce the number of false positives that may result when a user makes an inquiry to the list 105, as discussed in greater detail below.

Each item 102 in the list 105 turns on one or more bits in the bit array 110. That is, initially all the bits in the bit array 110 are low and are changed to high based on an item 102 in the list 105. More specifically, each item 102 in the list 105, once encoded by encoder 107, indicates which bit or bits to turn on in the bit array 110 to represent the item 102. For example, the first item 102 in the list 105 may turn on bits 1, 3, 11, as shown in FIG. 1. The second item 102 in the list 105 may turn on bits 5, 7, and 10, and so on. Multiple items 102 in the list 105 may turn on the same bit. For example, a first, fourth, and tenth item 102 in the list 105 may turn on bit 11. Practically speaking, once a bit is turned on by an item 102, it remains on and is unaffected if other items 102 indicate that it should be turned on.

Each item 102 may turn on one or multiple bits in the bit array 110. In the example above, each item 102 turns on three (3) bits. However, a greater or lesser number of bits may be turned on for each item 102. The number of bits to turn on may be chosen to reduce the number of false positives that may result when a user makes an inquiry to the list 105, as discussed in greater detail below.

Once the encoder 107 has encoded each item 102 in the list 105, a bit array 110 with high and low values is used to represent the items 102 in the list 105. The bit array 110 may then be used by third parties for inquiry purposes without the content of the list 105 being revealed. Referring to FIG. 2, the bit array 110 may be embodied in a validation system 207 for allowing users to query the list 105 to determine whether an inquiry item 202 is on the list 105. For example, assume that the bit array 110 represents a list of all person with access to a building. Users of the bit array 110 may query the list 105 to determine whether a name is on the list 105 by inputting the name, i.e., the inquiry item 202, into the validation system 207. The validation system 207 may return a "yes" response, indicating that the name is on the list, or may return a "no" response, indicating the name is not on the list.

Figure 2A:
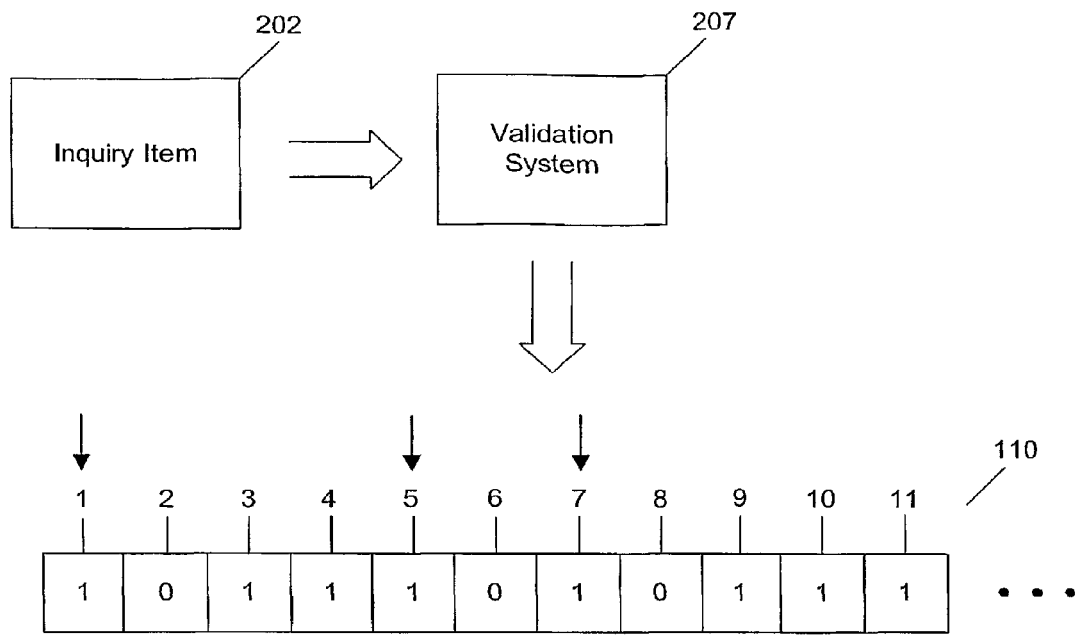
FIGS. 2A and 2B illustrate a process of determining whether an inquiry item is on a list represented by a bit array consistent with an embodiment of the present invention.
Figure 2B:
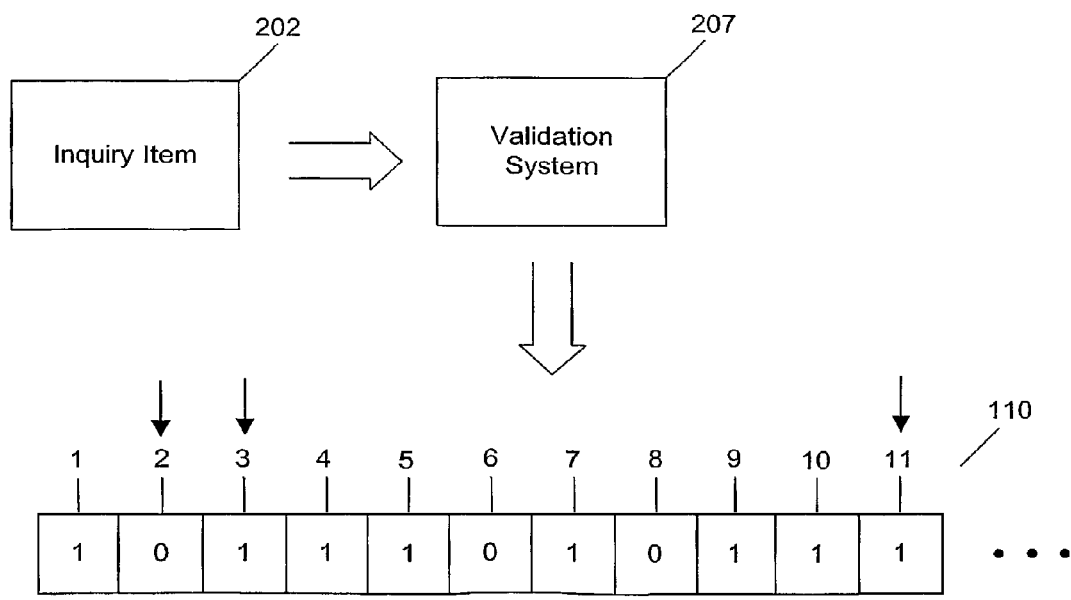

The inquiry item 202 undergoes the same encoding process that an original list item 102 undergoes. That is, the validation system 207 executes the same encoding process executed by the encoder 107. Recall that for the original list items 102, the encoder 107 determines which bits of the bit array 110 to turn on. For an inquiry item 202, the validation system 207 determines which bits of the bit array 110 to check. If all the bits checked are high, then the inquiry item 202 is determined to be part of the list. If at least one of the bits checked is low, then the inquiry item 202 is determined not to be part of the original list 105. For example, assume that that the validation system 207 processes the inquiry item 202, determining which bits to check. In FIG. 2A, the validation system 207 checks bits 1, 5, and 7. Because bits 1, 5, and 7 are all high, the validation system 207 determines that the inquiry item 202 is on the original list 105 and returns an affirmative. As another example, in FIG. 2B, the validation system 207 checks bits 2, 3, and 11. Because bit 2 is low, the validation system 207 determines that the inquiry item 202 is not on the original list 105 and returns a negative response. In this way, an owner of a list may provide a coded list to third parties to determine whether an item is on a list, without revealing the content of the list.

Figure 7:
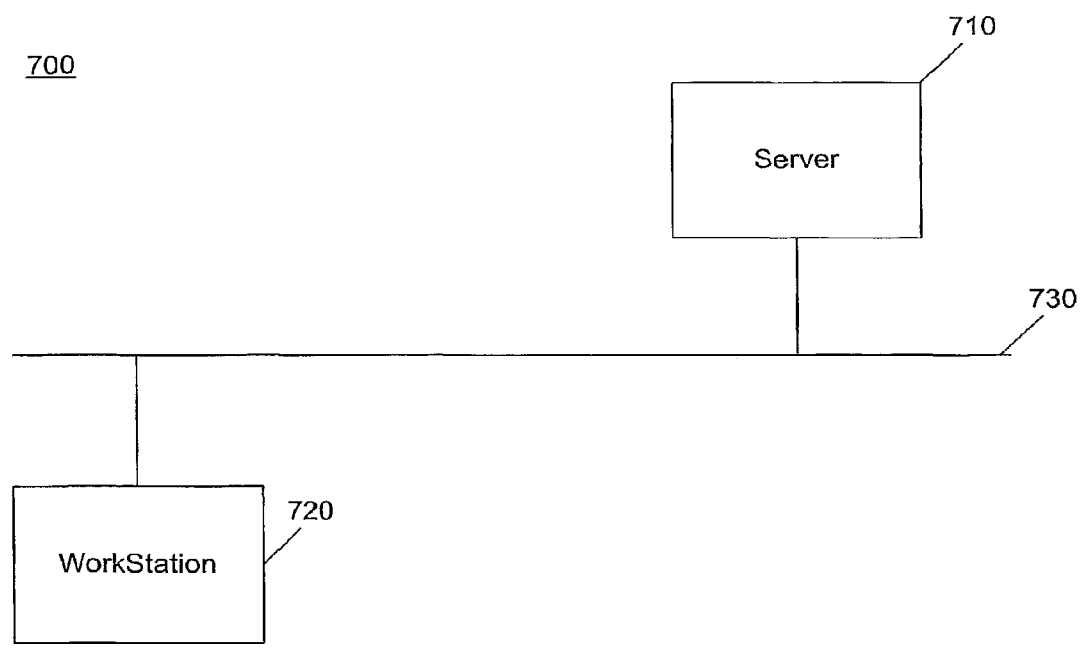
FIG. 7 illustrates an exemplary system network that may be used to practice the invention.

FIG. 7 illustrates an exemplary system network 700 in which to practice the present invention. The network 700 consists of a server 710, a workstation 720, and a communication link 730. The server 710 may store the bit array 110 and validation system 207 used to determine whether an inquiry item 202 is on a list 105. The workstation 720 may be a personal computer having a keyboard for inputting an inquiry item 202. The communication link 730 transmits the inquiry item 202 to the server 710 wherein the validation system 207 processes the inquiry item 202 and returns an affirmative or negative response via the communication link 730 to the workstation 720. The network 700 may be a local area network (LAN) or a wide area network (WAN) to include the Internet, for example. The network 700 may be wireless. In an alternate embodiment, a stand-alone workstation may store the bit array 110 and validation system 207 and a user may input an inquiry item 202 via the workstation's keyboard or other input device to determine locally whether the inquiry item 202 is on a list 105.

Figure 3:
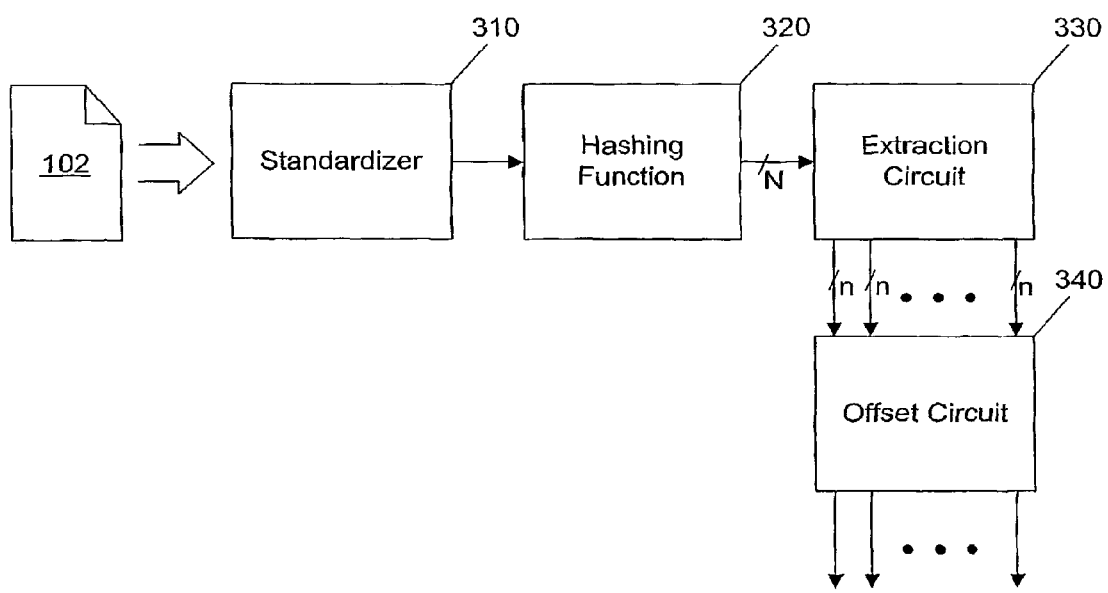
FIG. 3 illustrates an encoder for encoding a list of items into a bit array consistent with an embodiment of the present invention.

FIG. 3 illustrates an exemplary encoder 107 for encoding a list 105, resulting in an array of bits 110, as described above. The encoder 107 comprises a standardizer 310, a hashing function unit 320, an extraction circuit 330, and an offset circuit 340.

The standardizer 310 converts an input into a standard format prior to encoding. This step may be desirable for a list that may contain multiple variations of the same information. For example, a list that contains addresses may have multiple entries of the same address in different formats. It may be more efficient to encode a single representation of the same item than to encode each variation of the item. For instance, assume that multiple variations for an address are provided on a list. The entries include: 123 Main Street, Apartment 456; 123 Main St., Apt. 456; and 123 Main St., #456. The standardizer 310 may convert each of these entries to 123 Main St. 456 and encode this representation of the address rather than encoding each variation of the address.

Figure 6:
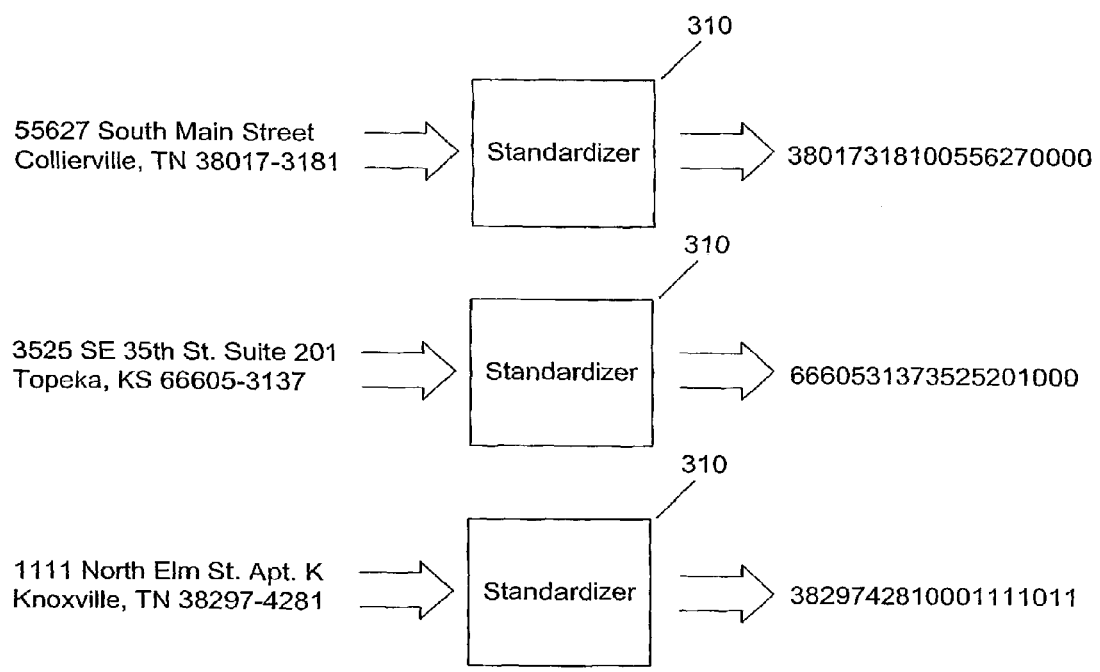
FIG. 6 illustrates an exemplary method of standardizing an address consistent with an embodiment of the present invention.

The standardizer 310 may standardize a list in accordance with the teachings disclosed in the provisional application No. 60/277,622 entitled, "A Method For Standardizing A Mailing Address, Enhanced Modified Delivery Point", by Robert Snapp, filed on Mar. 22, 2001, which is incorporated by reference. The provisional application discloses a method for standardizing a mailing address into a numeric string. As shown in FIG. 6, a mailing address may be standardized by concatenating the nine-digit zip code of the address; a seven digit segment comprising the address number (i.e., the primary number) preceding the address name and the address number (i.e., the secondary number) following the address name (e.g., the suite or apartment number); and a three digit segment comprising a numeric representation of up to two alphanumeric characters which may appear in the primary or secondary number (e.g., Apt. K). The seven-digit segment may be padded with leading zeros if the total number of digits in the primary number and secondary number is less than seven digits. For the three digit segment, the numeric representation of a single alphanumeric character in the primary or secondary number may be as follows: space=0, A=1, B=2, . . . , Z=26. The numeric representation of two alphanumeric characters in the primary or secondary number may be determined by multiplying the numeric value of the first alphanumeric character by 27 and then adding the value of the second alphanumeric character (e.g., AA=1×27+1; ZZ=26×

27+26). It will be understood by those of ordinary skill in the art that a different standardization technique may be used to standardize a list of items.

Once a list item 102 is standardized, it is input to the hashing function unit 320. The hashing function unit 320 may execute a one-way hash function, i.e., a function that transforms an input item making it difficult to impossible to reproduce the input. For example, a one-way hash function may take an input and produce an N-bit object having no obvious relationship to the input. Furthermore, a hash function may produce significantly different outputs for similar, but not identical, inputs. In an exemplary embodiment, the hashing function unit 320 executes a secure hashing algorithm, SHA-1, which was developed by the National Institute of Standards and Technology (NIST) and is an ANSI standard encryption technique.

The SHA-1 transforms an input into a 160-bit (20 byte) object called a message digest. The SHA-1 sequentially processes blocks of 512 bits when computing the message digest. Therefore, the SHA-1 pads an input bit string to produce a bit string with a length that is a multiple, n, of 512 prior to processing the input bit string. The SHA-1 pads the input bit string by appending a "1" to the input bit string, followed by a number of "0"s depending on the original length of the input bit string, followed by a 64-bit integer representing the original length of the input bit string. The number of "0"s appended to the input bit string equals a number which will produce a bit string with a length that is a multiple of 512 once the "1", the "0"s, and the 64-bit integer is added to the input bit string. For example, to pad an input bit string with a length of 40, a "1" is appended to the input bit string, followed by 407 "0"s, followed by a 64-bit integer representing the length of the input bit string (i.e., 40).

The padded input bit string is viewed as a sequence of n blocks $M_1, M_2, \ldots, M_n$, where $M_i$ contains 16 words. Constant words $K_0, K_1, \ldots, K_{79}$ are used in the SHA-1, where, in hex,:

$K_t$=5A827999 ($0 \leq t \leq 19$)
$K_t$=6ED9EBA1 (($20 \leq t \leq 39$)
$K_t$=8F1BBCDC ($40 \leq t \leq 59$)
$K_t$=CA52C1D6 ($60 \leq t \leq 79$)

To generate the 160-bit message digest, the SHA-1 processes the blocks, $M_i$, for i=1, . . . , n. For each block, $M_i$, the SHA-1 computes constants words $H_0, H_1, H_2, H_3$, and $H_4$. Initially, for block $M_1$, $H_0$=67452301, $H_1$=EFCDAB89, $H_2$=98BADCFE, $H_3$=10325476, and $H_4$=C3D2E1F0 (all in hex). $H_j$ for j=0, 1, 2, 3, 4 for subsequent blocks, $M_i$, initially equals the $H_j$ computed for the previous block. The $H_0, H_1, H_2, H_3$, and $H_4$ computed for block $M_n$ is the 160-bit message digest.

Each block, $M_i$, is processed in the following manner. First, block $M_i$ is divided into 16 words, $W_0, W_1, \ldots, W_{15}$. In addition, the following variables are initialized: $A=H_0, B=H_1, C=H_2, D=H_3$, and $E=H_4$. For t=0 to 79, the SHA-1 computes the following equations:

TEMP=$S^5(A)+f_t(B,C,D)+E+W_t+K_t$ $E=D; D=C; C=S^{30}(B); B=A; A$=TEMP where:
$S^n(X)$ is a circular shift of X by n positions to the left
$f_t(B,C,D)=(B \wedge C) \vee (\sim B \wedge D)$ ($0 \leq t \leq 19$)
$f_t(B,C,D)=B$ XOR $C$ XOR $D$ ($20 \leq t \leq 39$)
$f_t(B,C,D)=(B \wedge C) \vee (B \wedge D) \vee (C \wedge D)$ ($40 \leq t \leq 59$)
$f_t(B,C,D)=B$ XOR $C$ XOR $D$ ($60 \leq t \leq 79$)
$W_t=S^1(W_{t-3}$ XOR $W_{t-8}$ XOR $W_{t-14}$ XOR $W_{t-16})$ ($16 \leq t \leq 79$)
$X \wedge Y$=bitwise logical "and" of X and Y $X \vee Y$=bitwise logical "inclusive-or" of X and Y
$X$ XOR $Y$=bitwise logical "exclusive-or" of X and Y
$\sim X$=bitwise logical "complement" of X
$X+Y=(x+y)$ mod $2^{32}$ converted to a word, where x is the integer of X and y is the integer of Y.

After the above equations have been computed, $H_j$ is computed as follows:

$H_0=H_0+A$ $H_1=H_1+B$ $H_2=H_2+C$ $H_3=H_3+D$ $H_4=H_4+E$

As stated above, the $H_0, H_1, H_2, H_3$, and $H_4$ computed for block $M_n$ is the 160-bit message digest.

Figure 4:
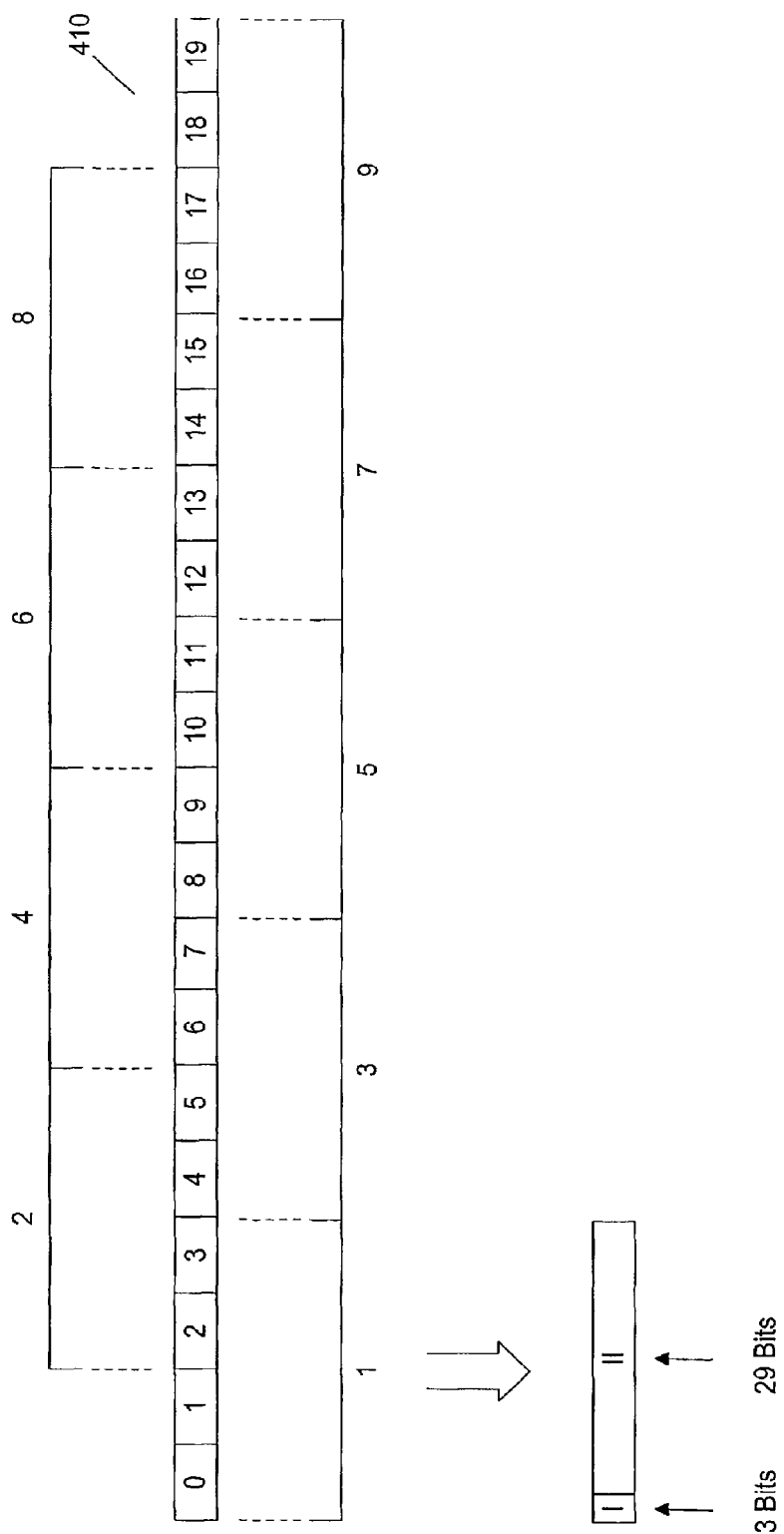
FIG. 4 illustrates an exemplary method of extracting bit samples consistent with an embodiment of the present invention.

The extraction circuit 330 extracts multiple n-bit samples from the N-bit object input from the hashing function unit 320. If the size of the bit array 110 is equal to $2^x$ bits, then the size of each sample extracted from the N-bit object should be equal to or greater than x bits. The number of samples to extract from the N-bit sample may correspond to the number of bits that are turned on during the encoding process for each list item 102. In the case of the SHA-1, for example, the extraction circuit 330 may extract nine (9) 32-bit samples from the 160-bit object input from the hashing function unit 320. FIG. 4 illustrates an example of how an extraction circuit 330 may extract multiple 32-bit samples 1 through 9 from a 160-bit object 410. Each number block (i.e., 0, 1, 2, etc.) represents a byte. The multiple n-bit samples extracted by the extraction circuit 330 are input to the offset circuit 340. It will be understood by a person of ordinary skill in the art that a different extraction technique may be employed.

The offset circuit 340 determines which bits in the bit array 110 to turn on based on the n-bit samples from the extraction circuit 330. Each n-bit sample turns on a bit in the bit array 110. Therefore, in FIG. 4, a total of 9 bits in the bit array 110 will be turned on based on the bit samples 1 through 9, respectively. FIG. 4 illustrates how a 32-bit sample for the 160-bit object 410 may be used to determine which bit in a bit array 110 to turn on. As shown in FIG. 4, a 32-bit sample is divided into 2 objects. The first object comprises the leftmost three bits in the 32-bit sample. The second object comprises the remaining 29 bits in the 32-bit sample. The second object determines which byte in the bit array 110 contains the bit to be turned on. The first object determines which bit in the byte to turn on. For example, a second object may determine that the first byte of a bit array 110 contains the bit to be turned on. The first object may determine that the third bit of the first byte of the bit array 110 is to be turned on, as illustrated in FIG. 1. It will be understood by a person of ordinary skill in the art that a different technique may be employed to determine which bits to turn on in the bit array 110.

The encoder 107 may be implemented in software, firmware, hardware, or any combination thereof. The bit array 110 may be stored in any semi-permanent or permanent holding place for digital data, such as a magnetic disk (e.g., floppy disk or hard disk), optical disk (e.g., CD, CD-ROM, DVD-ROM), or magnetic tape.

As discussed above, the size of the bit array 110 or the number of bits the encoder 107 turns on may be chosen to reduce the number of false positives that may result when a user makes an inquiry to the list 105. False positives result when the validation system 207 returns an affirmative response although an inquiry item 202 is not on the list 105.

This occurs because all the bits checked by the validation system 207 for the inquiry item 202 coincidentally where turned on by one or more other list items 102 during the encoding process. The probability of a false positive equals $$\left(\frac{S}{M}\right)^k,$$

where M equals the number of bits in the bit array 110, S equals the total number of bits turned on in the bit array 110, and k equals the number of bits the encoder 107 turns on per list item 102. Furthermore, S, the total number of bits turned on in the bit array 110, is approximately equal to $$M(1 - e^{-\frac{Nk}{M}}),$$

where N equals the number of list items 102. M, the number of bits in the bit array 110, and k, the number of bits turned on per list item 102, may be chosen to minimize the number of false positives based on the above equations. However, a higher false positive rate above the minimum may be chosen based on other considerations such as processing speed.

Figure 5:
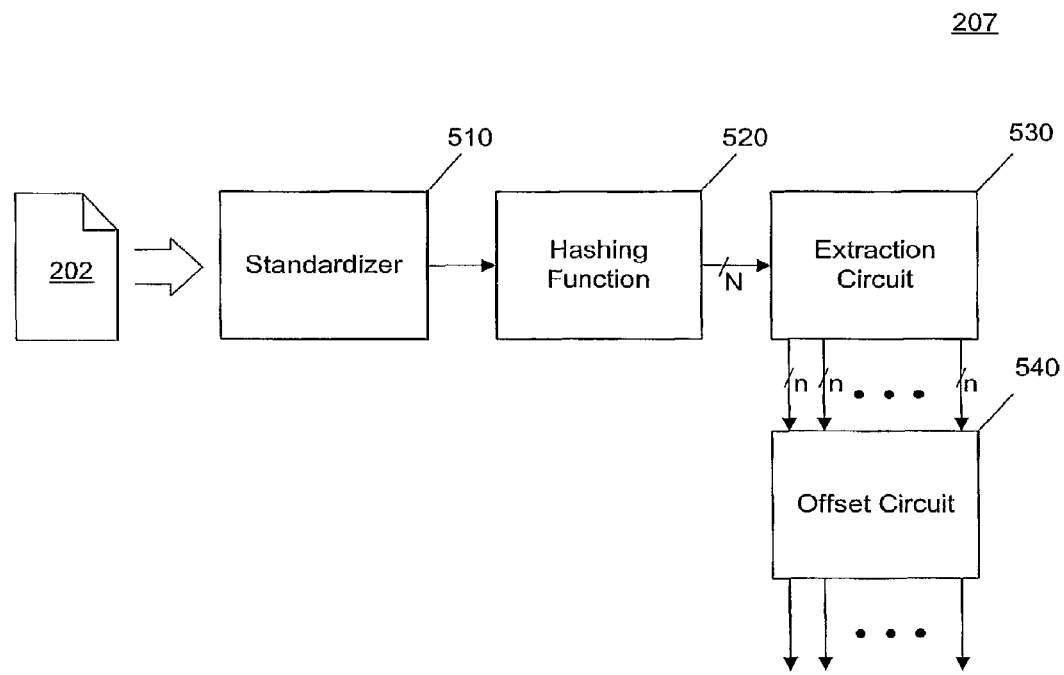
FIG. 5 illustrates a validation system for determining whether an inquiry item is on a list consistent with an embodiment of the present invention.

FIG. 5 illustrates an exemplary validation system 207 for validating an inquiry item 202. As discussed above, the validation system 207 utilizes the same encoding process as used by the encoder 107. Therefore, the validation system 207 of FIG. 5 is similar to the encoder 107 of FIG. 3. The validation system 207 comprises a standardizer 510, a hashing function unit 520, an extraction circuit 530, and an offset circuit 540.

When an inquiry is made to determine whether an inquiry item 202 is on a list, it may be desirable to standardize the inquiry item 202 prior to determining whether the inquiry item 202 is on the list. If an inquiry item 202 is not standardized, the validation system 207 may incorrectly determine that the inquiry item 202 is not on the list simply because it is in a different format. The standardizer 510 may eliminate this problem by converting the inquiry item 202 into a standard format prior to validating. The standardizer 510 may operate in a same manner as the standardizer 310. Once an inquiry item 202 is standardized, it is input to the hashing function unit 520.

The hashing function unit 520 executes the same one-way hash function that is executed by the hashing function unit 320, generating an N-bit object. The N-bit object is input to the extraction circuit 530.

The extraction circuit 530 extracts multiple n-bit samples from the N-bit object in the same manner that the extraction circuit 330 extracts multiple n-bit samples. The multiple n-bit samples extracted by the extraction circuit 530 are input to the offset circuit 540.

The offset circuit 540 determines which bits in the bit array 110 to test based on the n-bit samples from the extraction circuit 530. The offset circuit 540 makes this determination in the same manner that the offset circuit 340 determines which bits in the bit array 110 to turn on. The validation system 207 tests the bits indicated by the offset circuit 540. As discussed above, if the bits tested are all high, then the validation system 207 determines that the inquiry item 202 is on the list 105; if at least one of the bits is low, then the validation system 207 determines that the inquiry item 202 is not on the list 105.

The validation system 207 may be implemented in software embodied locally in a workstation or in a server as shown in FIG. 7. Alternatively, the validation system 207 may be implemented in firmware, hardware, or any combination of software, firmware, and hardware.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for representing a list of informational items using a bit array, comprising:
    converting, by a computer, an informational item to a cryptographic value by evaluating a hash function for at least a portion of the information item using a secure hashing algorithm;
    extracting a plurality of n-bit samples from the cryptographic value, the n-bit samples including at least a first field and a second field, the first field identifying a group of bits of the bit array, and the second field identifying one or more individual bits within the group of bits; and
    setting, by the computer, the individual bits to a pre-determined value according to the first field identifying the group of bits and the second field identifying the individual bits within the group of bits, wherein bits in the bit array have a pre-determined initial value different from the pre-determined value.

2. The method of claim 1, wherein converting the informational item to the cryptographic value further comprises:
    extracting the portion of the informational item;
    creating a standardized item for the information item from the extracted portion; and
    converting the standardized item to the cryptographic value.

3. The method of claim 1, wherein the informational item includes at least one of a name or an address.

4. A non-transitory computer-readable medium including instructions, which, when executed by a processor, cause the processor to perform a method for representing a list of informational items using a bit array, the method comprising:
    converting an informational item to a cryptographic value by evaluating a hash function for at least a portion of the information item using a secure hashing algorithm;
    extracting a plurality of n-bit samples from the cryptographic value, the n-bit samples including at least a first field and a second field, the first field identifying a group of bits of the bit array, and the second field identifying one or more individual bits within the group of bits; and
    setting the individual bits to a pre-determined value according to the first field identifying the group of bits and the second field identifying the individual bits within the group of bits, wherein bits in the bit array have a pre-determined initial value different from the pre-determined value.

5. The non-transitory computer-readable medium of claim 4, wherein the method further comprises:
    extracting the portion of the informational item;
    creating a standardized item for the information item from the extracted portion; and
    converting the standardized item to the cryptographic value.

6. The non-transitory computer-readable medium of claim 4, wherein the informational item includes at least one of a name or an address.

7. A computer-implemented method for determining whether an inquiry item is on a list represented by a bit array, comprising:
- converting, by a computer, the inquiry item into a cryptographic value by evaluating a hash function for at least a portion of the inquiry item using a secure hashing algorithm;
- extracting a plurality of n-bit samples from the cryptographic value, the n-bit samples including at least a first field and a second field, the first field identifying a group of bits of the bit array and the second field identifying one or more individual bits within the group of bits;
- checking bit values of the individual bits according to the first field identifying the group of bits and the second field identifying the bit positions within the group of bits; and
- providing the bit array to a third party to determine whether the inquiry item is on the list without revealing the list to the third party, wherein the list comprises a plurality of items and is encoded into the bit array using the secure hashing algorithm, and the list includes the inquiry item if the bit values of the individual bits of the bit array equal a predetermined value.

8. The method of claim 7, wherein converting the inquiry item to the cryptographic value further comprises:
- extracting the portion of the inquiry item;
- creating a standardized item for the information item from the extracted portion; and
- converting the standardized item to the cryptographic value.

9. The method of claim 7, wherein the inquiry item includes at least one of a name or an address.

10. A non-transitory computer-readable medium including instructions, which, when executed by a processor, cause the process to perform a method for determining whether an inquiry item is on a list represented by a bit array, the method comprising:
- converting the inquiry item into a cryptographic value by evaluating a hash function for at least a portion of the inquiry item using a secure hashing algorithm;
- extracting a plurality of n-bit samples from the cryptographic value, the n-bit samples including at least a first field and a second field, the first field identifying a group of bits of the bit array and the second field identifying one or more individual bits within the group of bits;
- checking bit values of the individual bits according to the first field identifying the group of bits and the second field identifying the bit positions within the group of bits; and
- providing the bit array to a third party to determine whether the inquiry item is on the list without revealing the list to the third party, wherein the list comprises a plurality of items and is encoded into the bit array using the secure hashing algorithm, and the list includes the inquiry item if the bit values of the individual bits of the bit array equal a predetermined value.

11. The non-transitory computer-readable medium of claim 10, wherein the method further comprises:
- extracting the portion of the inquiry item;
- creating a standardized item for the information item from the extracted portion; and
- converting the standardized item to the cryptographic value.

12. The non-transitory computer-readable medium of claim 10, wherein the inquiry item includes at least one of a name or an address.

* * * * *